Oct. 10, 1967  J. P. LAW  3,345,729
FASTENER POSITIONER
Filed Oct. 4, 1965  3 Sheets-Sheet 2
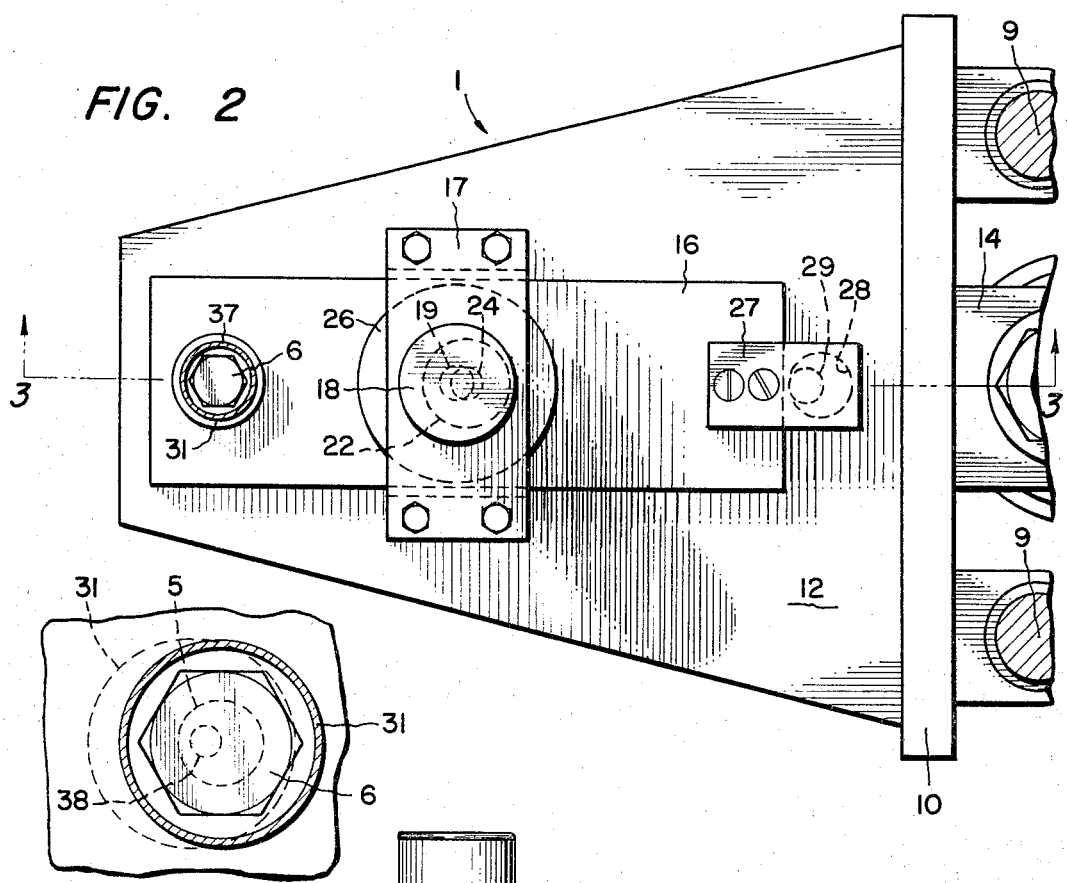
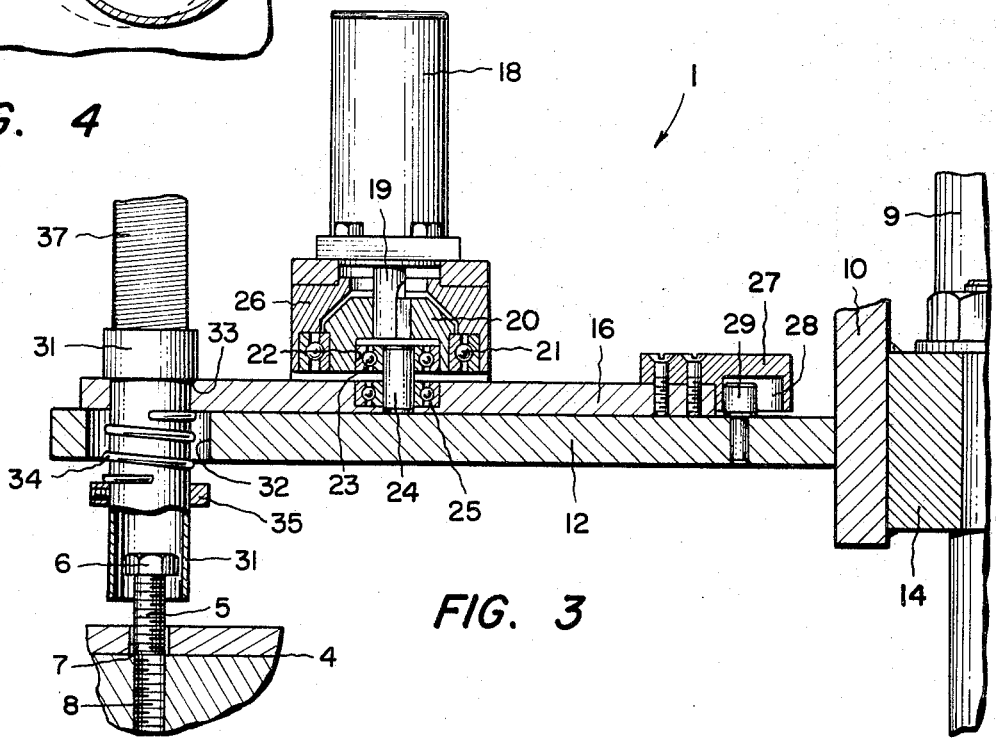

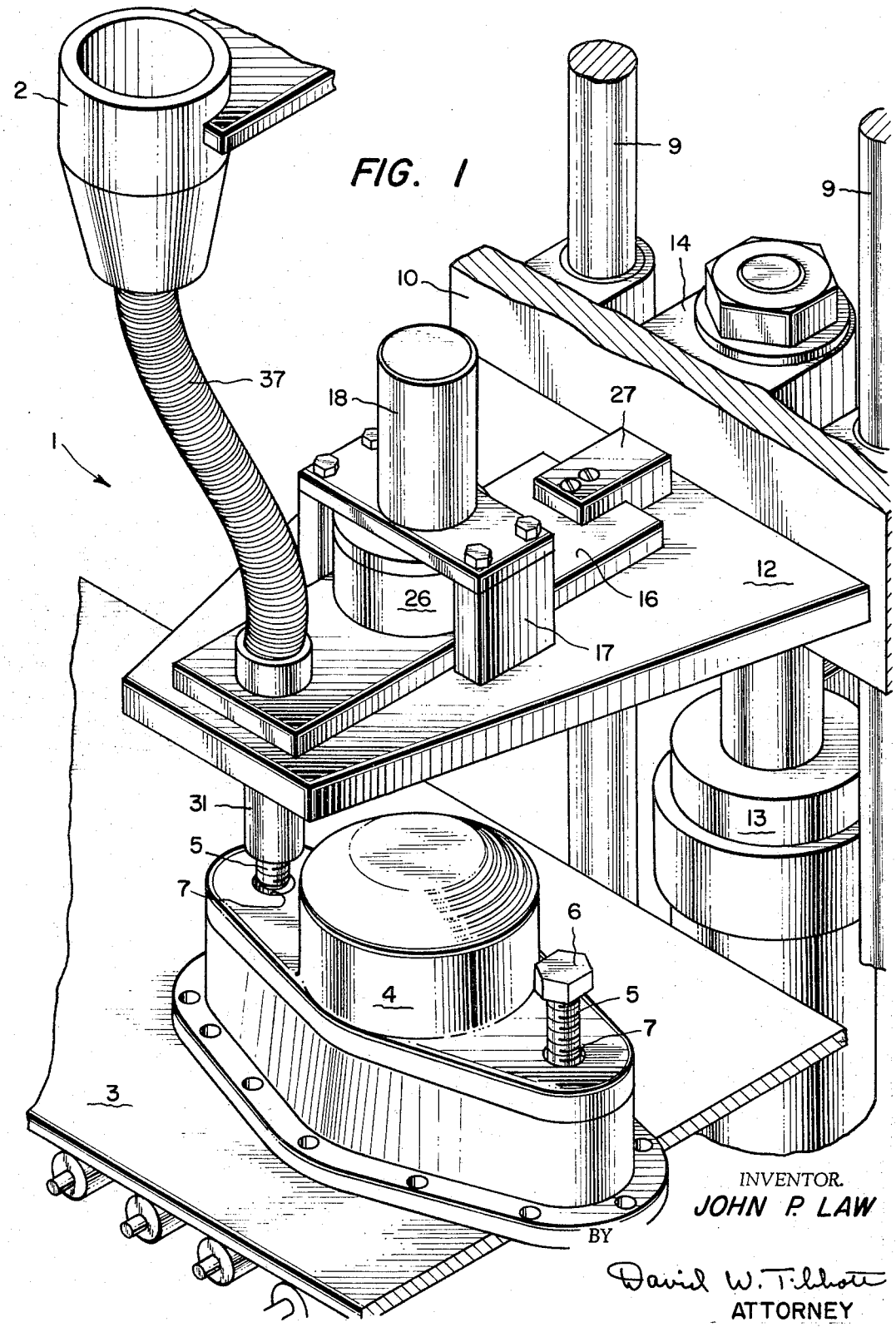

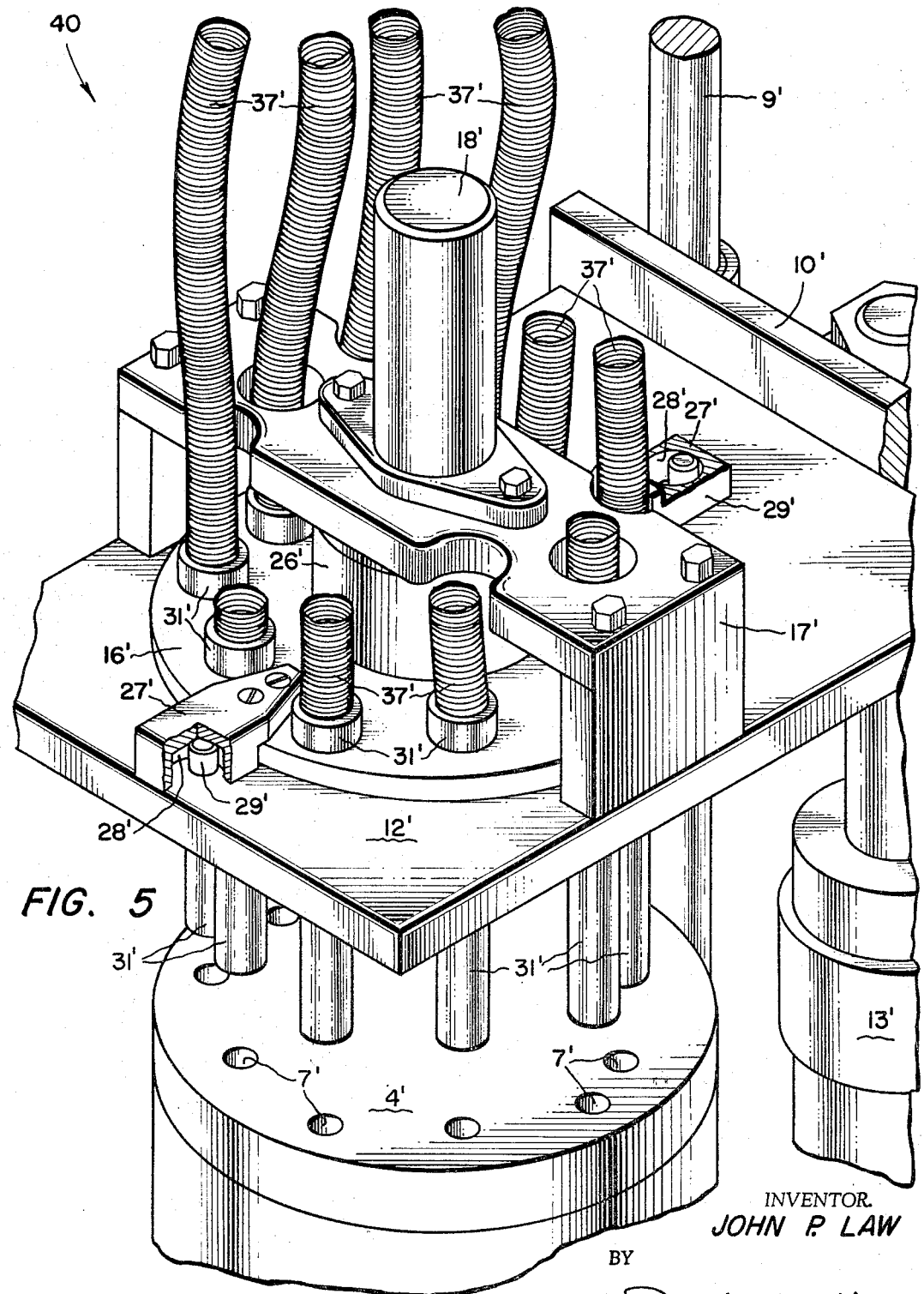

United States Patent Office 3,345,729
Patented Oct. 10, 1967

3,345,729
FASTENER POSITIONER
John P. Law, Athens, Pa., assignor to Ingersoll-Rand Company, New York, N.Y., a corporation of New Jersey
Filed Oct. 4, 1965, Ser. No. 492,463
8 Claims. (Cl. 29—211)

This invention relates generally to the fastener handling and manipulating art and particularly to a device for feeding and inserting or positioning elongated fasteners, such as bolts, in pre-formed holes.

The usual operation of inserting or positioning and starting fasteners, such as bolts, is performed by hand. As is well known, the use of the hand for performing simple, repetitious operations is generally undesirable in industry because hand labor is time consuming and expensive. Because hand labor is relatively expensive, it normally is more economical for industry to employ machines to perform simple repetitious jobs when practical machines are available.

The principal object of this invention is to provide a practical apparatus for feeding and positioning elongated fasteners in pre-formed holes in a workpiece.

Other important objects are to provide a device for inserting and starting threaded fasteners in corresponding threaded holes; to provide a machine for simultaneously positioning, inserting and starting a plurality of fasteners in their holes; to provide a fastener positioning machine which is simple, foolproof, inexpensive and fast in operation; and to provide a fastener positioning machine which is not likely to break down because of fasteners "jamming" therein.

In general, the objects of the invention are attained in the apparatus of this invention by arranging a movable carriage over a fastener receiving hole in a workpiece, mounting a tube on the carriage over the hole where it can contain a fastener resting over the hole, and oscillating the carriage in a manner causing the tube to rotatively oscillate the fastener around the hole and to drop quickly into the hole. If the fastener and hole contain mating threads, the oscillation can also rotate the fastener in a rotary direction causing the fastener threads to be "started" into the hole threads.

The invention is described in connection with the accompanying drawings wherein:

FIG. 1 is a perspective view with portions broken away of a bolt positioning apparatus built in accordance with this invention and shown placing a bolt in a hole in a workpiece located beneath the positioner;

FIG. 2 is a plan view of the embodiment of FIG. 1;

FIG. 3 is a section taken on line 3—3 of FIG. 2;

FIG. 4 is a diagrammatic view illustrating the operation of the apparatus; and

FIG. 5 is a perspective view of another embodiment which can position a plurality of fasteners simultaneously in their holes.

The apparatus shown in FIG. 1 includes a bolt positioner generally indicated by the reference number 1. The bolt positioner 1 is shown receiving bolts from a bolt dispenser 2 and is located over a conveyor belt 3 carrying a workpiece 4. A pair of bolts 5 having hexagonal-shaped heads 6 are shown mounted on the workpiece 4 with their stems, also indicated by the reference number 5, extending into pre-formed holes 7 provided in the workpiece 4. The bolt hole 7 includes a threaded portion 8, shown in FIG. 3.

The bolt positioner 1 includes a pair of vertical guide posts 9 mounted beside the conveyor belt 3 and a frame 10 containing slides 11 slidably mounted on the post 9 for vertical reciprocating travel. The frame 10 is moved up and down by a hydraulic jack 13 connected to a tongue 14 extending from the rear of the frame 10. The frame 10 further includes a table 12 extending horizontally over the conveyor belt 3 and the workpiece 4.

A carriage 16 rests freely on the table 12 so that it can slide on the table for a limited movement. A stand 17 is fixed on the table to extend over the carriage 16 and carries a motor 18. The body of the motor 18 extends vertically upward from the stand 17 and contains a motor shaft 19 projecting downwardly through an opening in the stand as shown in FIG. 3. The shaft 19 carries a rotor 20 mounted in bearings 21 carried by a stationary shroud 26 fixed on the stand 17. The lower face of the rotor 20 contains an eccentrically located cavity 22 opening downwardly therefrom.

A stub shaft 24 is rotatably mounted in the eccentric cavity 22 by a bearing 23. The stub shaft 24 also is mounted in the carriage 16 by a carriage bearing 25. The eccentricity of the cavity 22 relative to the motor 18 and motor shaft 19 is illustrated in FIG. 2 by the dotted-line circles carrying the various reference numerals. Due to the eccentric mounting of the stub shaft 24, the rotation of the motor shaft 19 forces the carriage 16 to move in a rotary path corresponding to the rotary path of the stub shaft 24.

The carriage 16 is forced to oscillate, rather than rotating, by being loosely anchored to the table 12 by an anchor means including a strap 27 fixed on the carriage 16 and containing a socket 28 receiving the head of a pin 29 fixed in the table 12. The socket 28 is sufficiently larger than the head of the pin 29 to provide enough clearance to allow the carriage 16 to oscillate with the eccentric swing of the stub shaft 24. It should be clear that as the carriage 16 oscillates, it moves to the pin 29 for a limited distance in all directions.

A bolt positioning tube 31 is supported on and extends through the carriage 16 and a large opening 32 provided in the table 12. The opening 32 is larger than the tube 31 to provide clearance for the tube 31 to oscillate in the opening 32. As shown in FIGS. 1 and 3, the tube is located in the carriage 16 where it can be positioned over a bolt hole 7 in the workpiece 4. Preferably, the tube 31 is mounted in the carriage 16 with a slight clearance so that the tube 31 can tilt slightly in the carriage 16 during the operation of the device. The purpose of this sloppy mounting will be explained in connection with the description of the operation of the device.

The tube 31 contains a downwardly facing shoulder 33 adapted to rest on the upper face of the carriage 16 as shown in FIG. 3. The tube 31 is urged downward by a spring 34 engaged between the lower face of the carriage 16 and a collar 35 fixed on the tube 31 below the carriage 16. This resilient mounting will allow the tube 31 to move upwardly in case it engages either the workpiece 4 or some other obstruction.

The upper end of the tube 31 is connected to the bolt dispenser 2 by a flexible hose or conduit 37. The inside diameters of the hose 37 and the tube 31 are selected so that the bolt 5 can slide axially and loosely through these members without jamming. In addition, there is a substantial clearance between the bolt head 6 and the interior of the tube 31, as shown in FIG. 4. This clearance is important for the proper operation of this device.

FIG. 4 diagrammatically illustrates the rotary oscillation path of the tube 31 and the bolt 5, contained therein, during the oscillation of the carriage 16. The solid-line position of the tube 31 illustrates the position of the tube at one moment in its oscillation path and the dotted-line position of the tube 31 illustrates the position of the tube after it has moved 180° along its oscillation path. The small circle 38 illustrates the rotary path in which the axis of the path of the tube 31 travels as it oscillates. The oscillation of the tube 31 and its bolts 5 will cause the bolt 5 to be vibrated into the bolt hole 7 whereby the continued oscillation of the tube 31 will create a tendency to rotate and start the bolt 5 in its threads, i.e., the threaded portion 8 of the hole 7 shown in FIG. 3.

OPERATION

In the operation of the bolt positioner 1, it should be understood that the conveyor belt 3 will carry the workpiece 4 beneath the bolt positioner 1 and hold the workpiece in a stationary position long enough for the positioner 1 to insert and, possibly, start a bolt 5 in the hole 7. Once the positioner 1 has completed its operation of inserting and starting a bolt 5 in one or more holes in the workpiece 4, the workpiece 4 will be moved on by the conveyor belt 3 to another station, not shown, where the bolts 5 will be driven "home" or turned down by a suitable wrench (not shown). It should be understood that the bolt positioner 1 is not a wrench but is simply a device for inserting a fastener into a pre-formed hole and possibly starting the threads of the fastener into corresponding threads in the workpiece.

At the start of operation it is assumed that the workpiece 4 is moved into proper position by the conveyor belt 3 where one of the bolt holes 7 is located directly beneath the tube 31 in the bolt positioner 1. Once the workpiece 4 is in position, the fluid-operated jack 13 is operated to lower the positioner 1 until the lower end of the tube 31 is adjacent the top of the bolt hole 7.

Thereafter the bolt dispenser 2 drops a bolt 5 down the conduit 37. This bolt 5 falls into tube 31 and stops in a position at the lower end of the tube 31. In this position, the lower end of the stem 5 of the bolt may engage the top surface of the workpiece 4 adjacent the hole, or in some cases, it may drop directly into the hole 7. Of course, if the bolt 5 consistently dropped into the hole 7, the oscillation of the bolt dispenser would not be necessary. It should be understood that the bolt 5 does not consistently drop into the hole 7 at the end of its fall through the hose 37 and tube 31.

As the bolt 5 drops downwardly through the tube 31, the tube is being oscillated at a slow speed in a rotary path due to the eccentric movement of the stub shaft 24 driven by the motor 18 and, also, due to the anchor means comprising the strap 27 and the pin 29. Assuming that the bolt 5 does not drop directly into the hole 7 but is stopped with its lower end resting on the upper edge of the hole 7, the rotary oscillating movement of the tube 31 will attempt to rotate the bolt 5 in a rotary path around the hole 7. This oscillation causes the stem of the bolt 5 to quickly drop into the bolt hole 7, as shown in FIG. 3. Thereafter continued rotation of the tube 31 will apply a rotary component of force to the bolt 5 which acts to rotate it into the threaded portion of the hole, thus starting the bolt into the hole porion 8.

In case the lower end of the tube 31 engages an obstruction, such as engagement with the workpiece 4, the tube 31 can move upwardly against the spring 34. This feature acts to protect the device against damage during use. After the bolts 5 are inserted and started into the workpiece 4, the bolt positioner 1 is again lifted by the hydraulic jack 13 until it is out of the way of the workpiece 4 whereby the conveyor belt 3 can move the workpiece 4 to another station containing a wrench (not shown) for driving the bolts 5 "home."

FIG. 5 illustrates a second embodiment 40 of the bolt positioner 1. This embodiment contains a plurality of tubes 31 and hoses 37 and is intended for the simultaneous inserting and starting of a plurality of bolts 5 in a workpiece 4. The parts of the second embodiment 40 corresponding to the parts of the first embodiment are given the same reference numbers accompanied by a prime.

Although a plurality of the embodiments of the invention are illustrated and described, it will be understood that the invention is not limited simply to these embodiments but contemplates other embodiments and variations which utilize the concepts and teachings of this invention.

Having described my invention, I claim:

1. A device for feeding, inserting and positioning elongated fasteners in pre-formed holes, comprising:
   a frame adapted to be mounted over a workpiece containing a fastener receiving hole;
   a carriage movably mounted on said frame for oscillatory horizontal movement over the workpiece;
   motor means mounted on said frame and connected to said carriage for oscillating said carriage in a generally rotary path;
   anchor means mounted on said frame and connected to said carriage for limiting its movement to an oscillatory path;
   a fastener positioning tube mounted on said carriage to oscillate with it and having its lower end located over the fastener receiving hole in the workpiece; and
   fastener feeding means connected to the upper end of said tube for selectively and individually dispensing a fastener into said tube where it is vibrated into place in the hole in the workpiece by the oscillation of the tube about the workpiece hole.

2. The device of claim 1 wherein:
   said frame includes a horizontal table extending over the workpiece and supporting said carriage for oscillatory movement.

3. The device of claim 2 wherein:
   said motor means includes a rotary motor mounted on said table and having an eccentric connection to said carriage so that said carriage is oscillated in an eccentric path by said motor.

4. The device of claim 3 wherein:
   said anchor means comprises a pin member and a socket member containing an enlarged socket receiving the pin with sufficient clearance therebetween to allow the two members to move relative to each other for a limited movement;
   one of said members being mounted on said table and the other member being mounted on said carriage.

5. The device of claim 4 wherein:
   said tube is loosely mounted on said carriage so that it can move on said carriage during the oscillating movement of said carriage.

6. The device of claim 5 wherein:
   said fastener feeding means includes a flexible conduit connected to the top of said tube for conveying fasteners to said tube.

7. The device of claim 6 including:
   means mounting said tube on said carriage allowing said tube to move on said carriage along its axis for a limited distance.

8. The device of claim 7 including:
   resilient means biasing said tube axially downward on said carriage.

References Cited

UNITED STATES PATENTS

| | | | |
|---|---|---|---|
| 2,672,630 | 3/1954 | Bitzer et al. | 10—162 |
| 2,768,431 | 10/1956 | Hughes | 29—200 |
| 3,061,919 | 11/1962 | Tack | 29—203 X |
| 3,067,495 | 12/1962 | Chase | 29—203 |
| 3,241,222 | 3/1966 | Timmermans | 29—211 X |

THOMAS H. EAGER, *Primary Examiner.*